United States Patent [19]

Johnson

[11] Patent Number: 4,674,790
[45] Date of Patent: Jun. 23, 1987

[54] ADJUSTABLE ARM REST AND CONSOLE ASSEMBLY

[75] Inventor: LeRoy B. Johnson, Perry, Mich.

[73] Assignee: Schmelzer Corporation, Flint, Mich.

[21] Appl. No.: 769,266

[22] Filed: Aug. 26, 1985

Related U.S. Application Data

[63] Continuation-in-part of Ser. No. 572,660, Jan. 20, 1984, and Ser. No. 769,265, Aug. 26, 1985.

[51] Int. Cl.⁴ ............................ B60J 9/00; A47C 7/54
[52] U.S. Cl. .................................. 296/153; 296/65 R; 297/411; 297/417; 248/118
[58] Field of Search ............... 296/153, 65 A, 65 R, 296/71; 297/412, 411, 417; 74/535, 577 R, 577 S, 578; 248/118

[56] References Cited

U.S. PATENT DOCUMENTS

| | | |
|---|---|---|
| 317,237 | 5/1885 | Stauffacher . |
| 419,093 | 1/1890 | Williams . |
| 722,311 | 3/1903 | Magerhans . |
| 791,060 | 5/1905 | Wallace . |
| 1,369,066 | 2/1921 | Waldheim ........................... 400/315 |
| 1,742,447 | 1/1930 | McKeag . |
| 1,892,048 | 12/1932 | Genung ............................... 297/412 |
| 1,970,816 | 8/1934 | Perky . |
| 2,325,292 | 7/1943 | Westrope . |
| 2,837,931 | 6/1958 | Brundage .......................... 33/315 X |
| 2,897,000 | 7/1959 | Hart et al. . |
| 2,943,831 | 7/1960 | Goss . |
| 2,975,994 | 3/1961 | Goss . |
| 3,038,757 | 6/1962 | Schulze . |
| 3,285,549 | 11/1966 | Cook . |
| 3,537,146 | 11/1970 | Caveney . |
| 3,637,253 | 1/1972 | Maule et al. ...................... 296/65 R |
| 3,642,088 | 2/1972 | Smith ............................. 296/65 R X |
| 3,900,923 | 8/1975 | Thomas . |
| 4,097,088 | 6/1978 | Meiller .............................. 297/417 X |
| 4,244,623 | 1/1981 | Hall et al. ........................... 297/417 |
| 4,272,047 | 6/1981 | Botka . |
| 4,311,338 | 1/1982 | Moorehouse ....................... 297/411 |
| 4,496,190 | 1/1985 | Barley ................................ 297/411 |
| 4,557,455 | 12/1985 | Benjamin . |

FOREIGN PATENT DOCUMENTS

| | | |
|---|---|---|
| 559424 | 10/1957 | Belgium . |
| 1755341 | 8/1971 | Fed. Rep. of Germany . |
| 2253819 | 3/1974 | Fed. Rep. of Germany . |
| 2318176 | 10/1974 | Fed. Rep. of Germany . |
| 2807023 | 8/1978 | Fed. Rep. of Germany ...... 296/153 |
| 1016138 | 11/1952 | France . |
| 57-60931 | 4/1982 | Japan . |
| 8101203 | 10/1982 | Netherlands . |
| 717256 | 10/1954 | United Kingdom . |
| 1144513 | 3/1969 | United Kingdom . |
| 1188241 | 4/1970 | United Kingdom . |
| 1186830 | 4/1970 | United Kingdom . |
| 1209283 | 10/1970 | United Kingdom . |
| 1229320 | 4/1971 | United Kingdom . |
| 1264097 | 2/1972 | United Kingdom . |
| 1314978 | 4/1973 | United Kingdom . |
| 1316862 | 5/1973 | United Kingdom . |
| 1578490 | 11/1980 | United Kingdom . |

Primary Examiner—Robert B. Reeves
Assistant Examiner—Russell D. Stormer
Attorney, Agent, or Firm—Harness, Dickey & Pierce

[57] ABSTRACT

An adjustable arm rest and console assembly is disclosed wherein the angular attitude or pitch, as well as the height, of the arm rest portion of the assembly are adjustable independently of one another in order to maximize user comfort. The mechanism for adjusting the angular attitude of the arm rest portion of the assembly, and for holding the arm rest portion in a preselected pivotally adjusted position, preferably includes a ratchet sub-assembly and a trip element for allowing selective incremental pivotal movement of the arm rest portion and for selectively releasing the ratchet sub-assembly, respectively. The mechanism for maintaining an adjusted height position includes a plurality of openings in one of a fixed or a movable support portion for the arm rest structure, with each of the openings corresponding to a preselected height position and being adapted for receiving a holding member movable into or out of such openings in order to maintain or release the arm rest structure and allow adjustment to a preselected elevational position.

58 Claims, 8 Drawing Figures

ADJUSTABLE ARM REST AND CONSOLE ASSEMBLY

BACKGROUND AND SUMMARY OF THE INVENTION

This is a continuation-in-part of a copending U.S. patent application Ser. No. 572,660, filed Jan. 20, 1984, entitled Adjustable Arm Rest, the disclosure of which is hereby incorporated by reference; and of a copending U.S. patent application Ser. No. 769,265 entitled Powered Adjustable Arm Rest, naming Paul Heimnick and LeRoy B. Johnson as inventors, and filed of even date herewith, the disclosure of which is also hereby incorporated by reference.

The invention relates generally to an adjustable arm rest assembly primarily adapted to be positioned adjacent an occupant seat or the like in a land or marine vehicle or in an aircraft. More specifically, the invention relates to an arm rest assembly that is free-standing and that can be mounted between adjacent, but spaced-apart, seats in order to function as an adjustable arm rest assembly, as well as an adjustable console-type structure. Furthermore, the invention relates to such an assembly wherein both the angular attitude (pitch) and the vertical height of the assembly are independently adjustable.

Various arm rest assemblies or similar structures have been provided for mounting or otherwise being positioned adjacent an occupant seat structure or the like in a land or marine vehicle or in an aircraft. Many of such prior assemblies have been adapted for mounting on a door panel or other generally vertical structure in the vehicle or aircraft. Some of these prior art rest assemblies have been provided with an adjustability feature in order to suit the user's comfort. However, many of such assemblies have not been provided with an adjustability feature at all, or have been provided with mechanisms for adjusting only the angular attitude, or only the height, of the arm rest assembly, but have not had the capability of adjusting either the angular pitch, the height, or both, independently of one another. Furthermore, such prior adjustable arm rest assemblies have typically not been adaptable for use as a center console-type structure for installation between spaced-apart seats in a vehicle or aircraft. In addition, many of the arm rest assemblies or console structures of the prior art have been found to be relatively expensive and complex to manufacture or install, to be relatively inconvenient to use, to be relatively heavy in weight, or to require frequent and expensive maintenance in order to keep them in good operating order.

It is a general objective of the present invention to provide an adjustable arm rest and console assembly, wherein both the angular attitude or pitch, as well as the height, of the arm rest portion of the assembly are adjustable independently of one another in order to maximize user comfort.

Another objective of the present invention is to provide such an independently adjustable arm rest and console assembly that is inexpensive to manufacture and install, that is simple and convenient to operate, that uses relatively simple and durable components, thereby minimizing the maintenance requirements of the assembly and providing for long life, and that is relatively light-weight in order to contribute to the fuel economy of a vehicle including an arm rest assembly according to the present invention.

According to one aspect of the present invention, an adjustable arm rest or console assembly includes a support structure adapted to be fixedly installed in a vehicle or the like, and an arm rest structure pivotally interconnected with the support structure such that the arm rest structure is pivotally movable relative to the support structure in order to preselectively adjust its angular attitude. A holding mechanism is provided for maintaining the arm rest structure in any of a number of preselected pivoted positions relative to support structure, and a release mechanism is provided for selectively releasing the holding mechanism in order to allow the arm rest structure to be selectively pivoted to any other of a number of preselected pivoted positions relative to the support structure. In a preferred embodiment of the invention, the holding mechanism includes a ratchet sub-assembly for allowing selective incremental pivotal movement of the arm rest structure in a first pivotal direction, while preventing pivotal movement of the arm rest structure in a second pivotal direction until the ratchet sub-assembly is selectively released or disengaged by the user. This pivotal movement feature is employable either with or without the translational movement feature discussed below.

In accordance with another aspect of an adjustable arm rest assembly according to the present invention, which can be used with or without the above-discussed pivotal movement feature, the arm rest assembly includes a support structure having a fixed support portion and a translationally movable support portion, with the movable support portion being selectively and translationally movable in directions toward and away from the fixed support portion. An arm rest structure is attached to the movable support portion for such translational movement therewith, and a holding mechanism is provided for maintaining the movable support portion and the arm rest structure in any of a number of preselected translated positions relative to the fixed support portion. The assembly includes a release mechanism for selectively releasing or disengaging the holding mechanism in order to allow the movable support portion and the arm rest structure to be translationally moved to any other of such preselected positions relative to the fixed support portion. In this embodiment, the arm rest structure can optionally be pivotally interconnected with the movable support portion, as discussed above, for pivotal movement relative thereto at any of the preselected translated positions of the arm rest structure and movable support portion relative to the fixed support portion.

In a preferred embodiment of the present invention including the above-discussed translational movement feature, the mechanism for maintaining the adjusted translational position includes a plurality of openings in either the fixed or movable support portions, with each of the openings corresponding to a preselected translated position. An elongated holding member is attached to the other of the fixed or movable support portions for limited movement relative thereto so that the elongated holding member can be selectively movable into any of the plurality of openings in order to support the movable support portion and the arm rest structure in any of the preselected translated positions relative to the fixed support portion. The holding member is also selectively movable out of engagement with the openings in order to allow the movable support portion and the arm rest structure to be translationally moved to any other of the preselected translated positions. A conveniently located actuating mechanism is also provided for ease of moving the holding member into or out of any of the plurality of openings.

Additional objects, advantages and features of the present invention will become apparent from the following description and appended claims, taken in conjunction with the accompanying drawings.

DETAILED DESCRIPTION OF THE PREFERRED EMBODIMENTS

Figure 1:
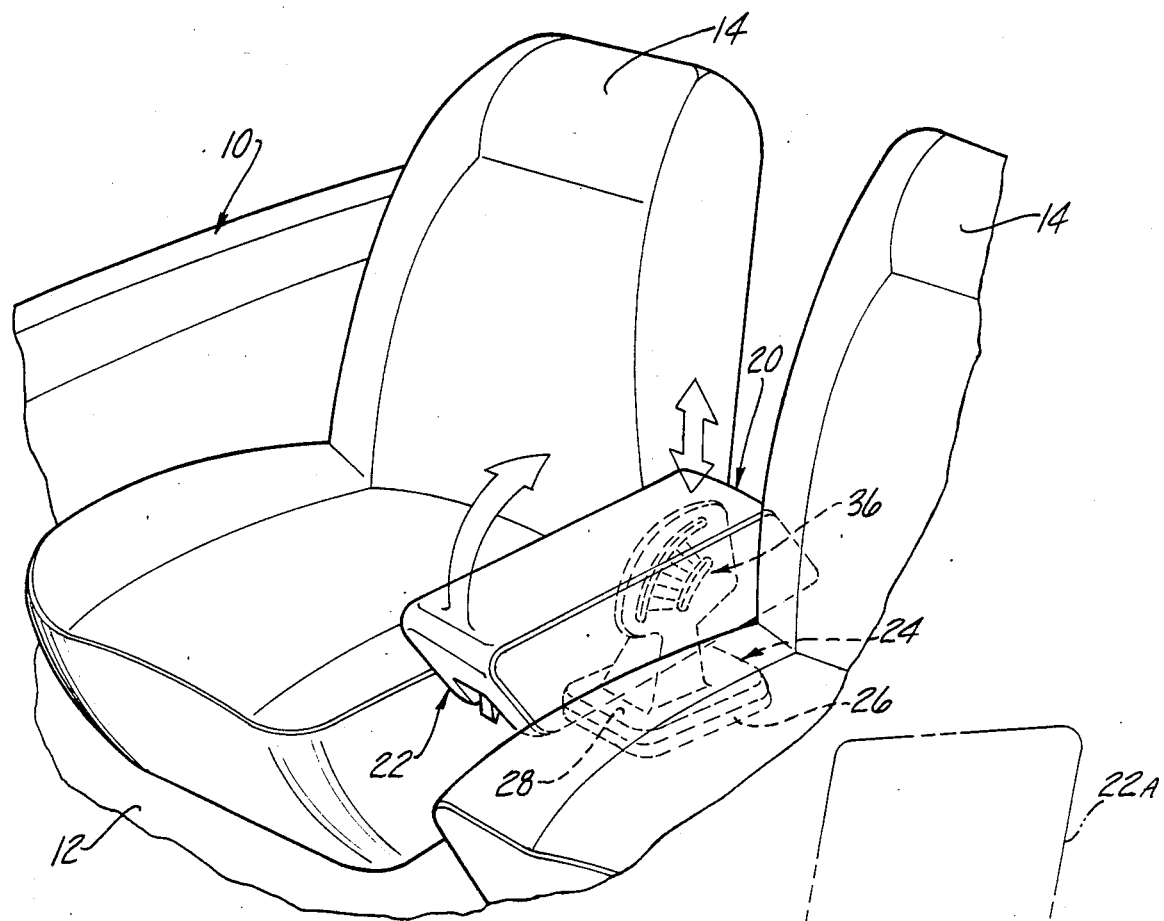
FIG. 1 is a partial perspective view of the interior of a vehicle or aircraft, illustrating an adjustable arm rest and console assembly according to the present invention installed between a pair of laterally spaced-apart seat structures.

FIGS. 1 through 8 of the drawings illustrate preferred exemplary embodiments of an adjustable arm rest and console assembly, according to the present invention, adapted for installation between laterally spaced-apart seat structures in a vehicle or aircraft. One skilled in the art will readily recognize from the following discussion, however, that the principles of the invention are equally applicable to an adjustable arm rest assembly that is not also adapted to be a console structure, that is adapted for installation in applications other than the particular vehicular application illustrated in the drawings, including stationary applications, or that varies from the particular structural configuration shown for purposes of exemplary illustration in the drawings.

In FIG. 1, a vehicle interior 10 generally includes a floor 12, a pair of laterally spaced-apart occupant seats 14, and an arm rest and console assembly 20 according to the present invention mounted on the floor 12 between the seats 14. As shown in FIGS. 1 through 5, the arm rest and console assembly 20 generally includes an arm rest structure 22 and a support structure 24, which in turn includes a fixed support portion 26 and a movable support portion 28, the function of which will be discussed in more detail below.

A pivot member 32 pivotally interconnects the arm rest structure 22 with the movable support portion 28 of the support structure 24 for pivotal movement relative to the support structure 24 through an arc 34. The pivot member 32 extends in a generally lateral direction through one or more bracket members 42, which are fixedly secured to a longitudinally-extending plate portion 44 of the arm rest structure 22, and extends through the movable support portion 28. The arm rest structure 22 is further interconnected with the movable support portion 28 by a ratchet mechanism 36 for selective incremental pivotal movement in a generally upward and rearwardly longitudinal direction relative to the support structure 24. The ratchet mechanism 36 is adapted for holding and maintaining the arm rest structure 22 in any of a number of preselected pivoted positions relative to the support structure 24 and thereby substantially prevents pivotal movement in a downward and forwardly longitudinal direction. As will be described in more detail below, the ratchet mechanism 36 is selectively releasable in order to allow the arm rest structure to be selectively and pivotally returned to its downward and longitudinally forward position in order to then selectively pivot the arm rest structure 22 to any other of the preselected pivoted positions relative to the support structure 24.

The ratchet mechanism 36 includes a rack member, which is preferably fixedly interconnected with the movable support portion 28, and a pawl member attached to, and carried by, one of the bracket members 42 of the arm rest structure 22, preferably in a socket portion 45 thereof. The pawl member 40 is interconnected with the bracket member 42 for limited lateral movement relative thereto and is preferably resiliently biased toward the rack member 38 by a spring 46, compressed between the pawl member 40 and the socket member 45, as perhaps best shown in FIGS. 3 through 5. The pawl member 40 is preferably an integral part of the bracket member 42, which is preferably composed of a somewhat flexible and resilient material, such as a synthetic resin, for example. Alternately, the pawl member 40 may be a separate member pivotally interconnected with the bracket member 42 in order to allow for the limited lateral movement of the pawl member 40 relative thereto.

The rack member 38, which is also preferably composed of a synthetic resinous material, includes a number of ratchet teeth 48 serially arranged, one-after-another, along a generally arcuately-extending path on the rack member 38. The ratchet teeth 48 are oriented and configured in an inclined shape such that they interferingly engage the oppositely-inclined pawl member 40, as perhaps best shown in FIGS. 3 and 4, in order to prevent pivotal movement of the arm rest structure 22 in a generally downward and longitudinally forward direction after the arm rest structure 22 has been pivoted to one of the preselected pivotal positions corresponding with each of the ratchet teeth 48. Because of their upwardly and laterally outwardly inclined shape, the ratchet teeth 48 allow the oppositely-inclined pawl member 40 to slidably and serially move along the arcuately arranged ratchet teeth 48 when the arm rest structure 22 is pivoted generally upwardly and longitudinally rearwardly. Because of the nature of the preferred synthetic resinous composition of both the pawl member 40 and the rack member 38, such slidable serial engagement therebetween occurs smoothly, quietly, and with relatively little appreciable wear, as well as contributing to the advantageous light-weight nature of the arm rest assembly 20.

Figure 2:
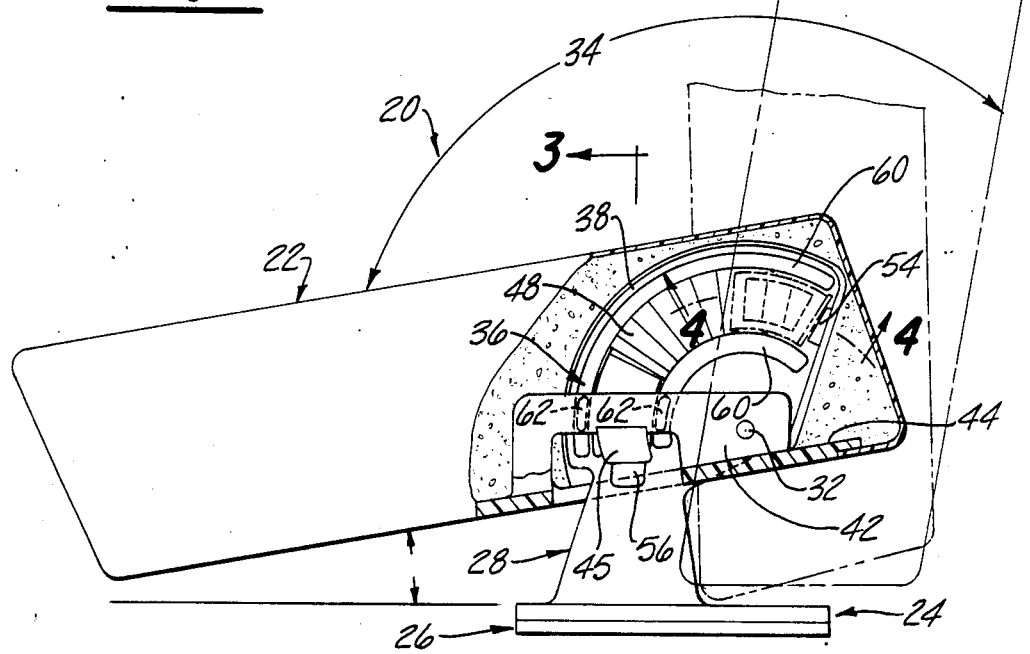
FIG. 2 is a side elevational view of the adjustable arm rest and console assembly of FIG. 1, with some exterior portions broken away to reveal interior components of the pivotal adjustment mechanism.
Figure 3:
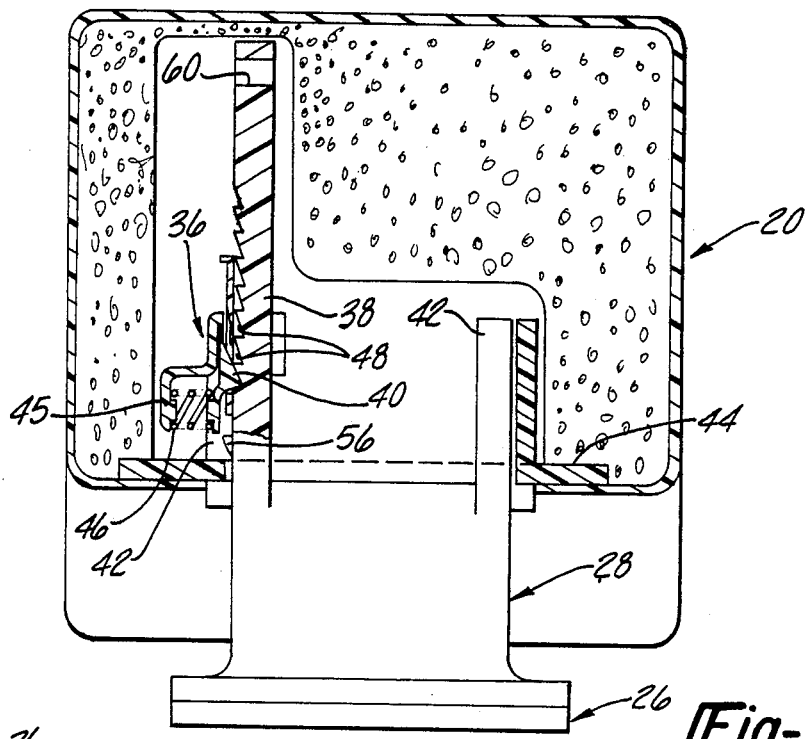
FIG. 3 is a partial cross-sectional view taken generally along line 3—3 of FIG. 2.

In order to release the ratchet mechanism 36 after the arm rest structure 22 has been pivoted to its uppermost position indicated in FIG. 2 by reference numeral 22A, a trip member 52 is slidably interconnected with, and slidably carried by, the pawl member 40 at a position between the pawl member 40 and the rack member 38. A portion of the pawl member 40 normally extends through an opening 53 in the generally plate-shaped trip member 52 in order to slidably engage the ratchet teeth 48, as discussed above.

A first abutment member 54 is integrally formed with, or fixedly attached to, the rack member 38 at a position such that the trip member 52 abuttingly engages the first abutment member 54 when the arm rest structure 22 is pivoted to its maximum upward and longitudinally rearward position 22A shown in FIG. 2. Such abutting engagement with the first abutment member 54 forcibly urges the trip element 52 to slidably move generally forwardly relative to the pawl member 40 into the position shown in FIG. 4, wherein the pawl member 40 is resiliently deflected out of engagement with the rack member 38. The arm rest structure 22 may then be freely pivoted generally downwardly and longitudinally forwardly with the pawl member 40 deflected out of an interfering engagement with the ratchet teeth 48. In order to once again hold and maintain the arm rest structure 22 in a preselected pivoted position, the arm rest structure 22 is then pivoted to its maximum downward position shown in solid lines in FIG. 2, wherein the trip member 52 abuttingly engages a second abutment member 56 fixedly interconnected with the rack member 38 at a lower position thereon. Such abutting engagement with the second abutment member 56 forcibly urges the trip member generally upwardly relative to the pawl member 40, such that the pawl member 40 resiliently returns to its normal position extending through the opening 53 in the trip member 52. The pawl member 40 is then again engageable with the ratchet teeth 48 so that the arm rest structure 22 can again be selectively and incrementally pivoted to a preselected intermediate position relative to the rack member 38 and held or maintained in such position by the interfering engagement between the pawl member 40 and the ratchet teeth 48.

It should be noted that the rack member 38 preferably includes one or more guide slots 60 extending along a generally arcuate path and adapted to slidably receive a corresponding number of arcuate guide pins 62 fixedly interconnected with at least one of the bracket members 42 for guiding and supporting the arm rest structure 22 as it pivotally moves, or is held in a preselected pivoted position, relative to the rack member 38. It should also be noted that although the rack member 38 is shown in the drawings as fixedly interconnected with the movable support portion 38 of the support structure 24, and the pawl member 40 is shown as interconnected with the bracket member 42 of the arm rest structure 22, such relationship can optionally be reversed. In such reversed arrangement, the rack member 38 is interconnected with the arm rest structure 22 and the pawl member 40 is interconnected with the movable support portion 28 of the support structure 24. In addition, it should also be noted that the above-discussed pivotal movement feature of the arm rest structure 22 relative to the support structure 24 can be employed either with or without the translational movement feature discussed below, and similarly the translational movement feature discussed below can be employed either with or without the pivotal movement feature discussed above.

As mentioned above, the arm rest and console assembly 20 is adapted such that the arm rest structure 22 and the movable support portion 28 can be selectively and translationally moved relative to the fixed support portion 26 of the support structure 24 regardless of the pivoted position (if any) of the arm rest structure 22. Furthermore, the arm rest structure 22 and the movable support portion 28 can be selectively held or maintained at any of a number of preselected translated positions relative to the fixed support portion 26, as well as being selectively releasable in order to allow the arm rest structure 22 and the movable support portion 28 to be selectively and translationally moved to any other of such preselected translated positions. The mechanism for accomplishing this height-adjusting function is shown primarily in FIGS. 5 through 7 and is discussed below.

The fixed support portion 26 preferably includes one or more column-like members 68 fixedly interconnected thereto and protruding in a generally upward direction therefrom. The column members 68 are slidably received in a corresponding number of openings 70 in the movable support portion 28 in order to guide and support the arm rest structure 22 and the movable support portion 28 as they are translationally moved generally upwardly or downwardly relative to the fixed support portion 26.

Figure 5:
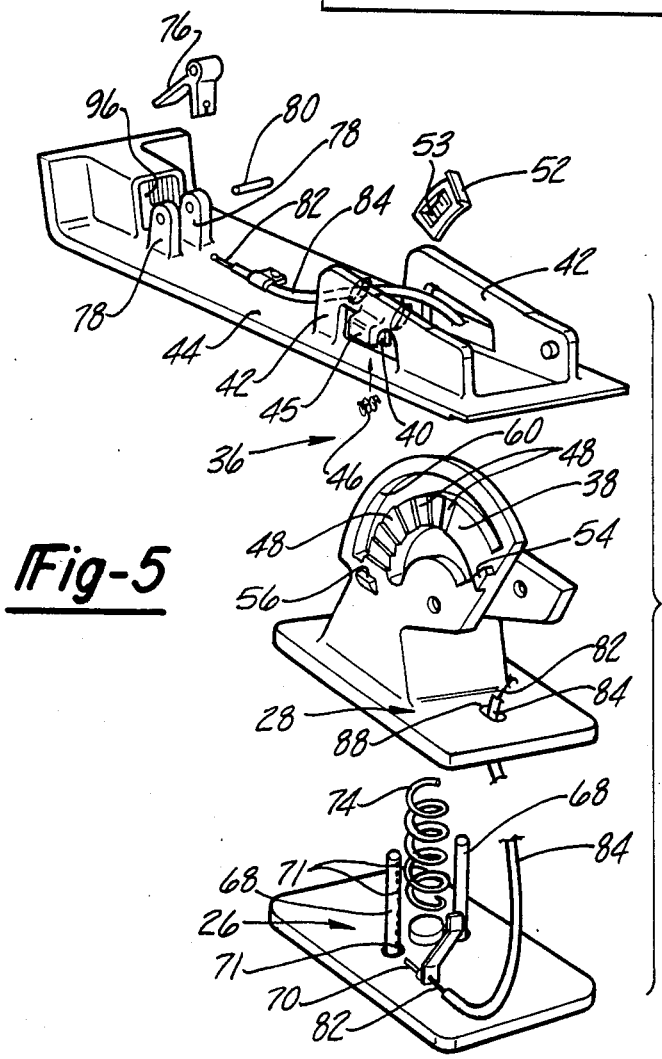
FIG. 5 is an exploded perspective view of the major internal components of the adjustable arm rest and console assembly of FIGS. 1 through 4.
Figure 4:
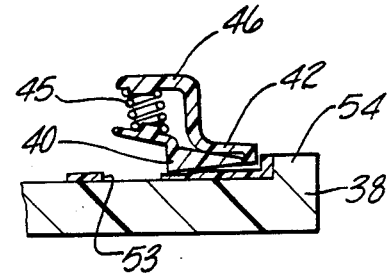
FIG. 4 is a partial cross-sectional view taken generally along line 4—4 of FIG. 2.
Figure 6:
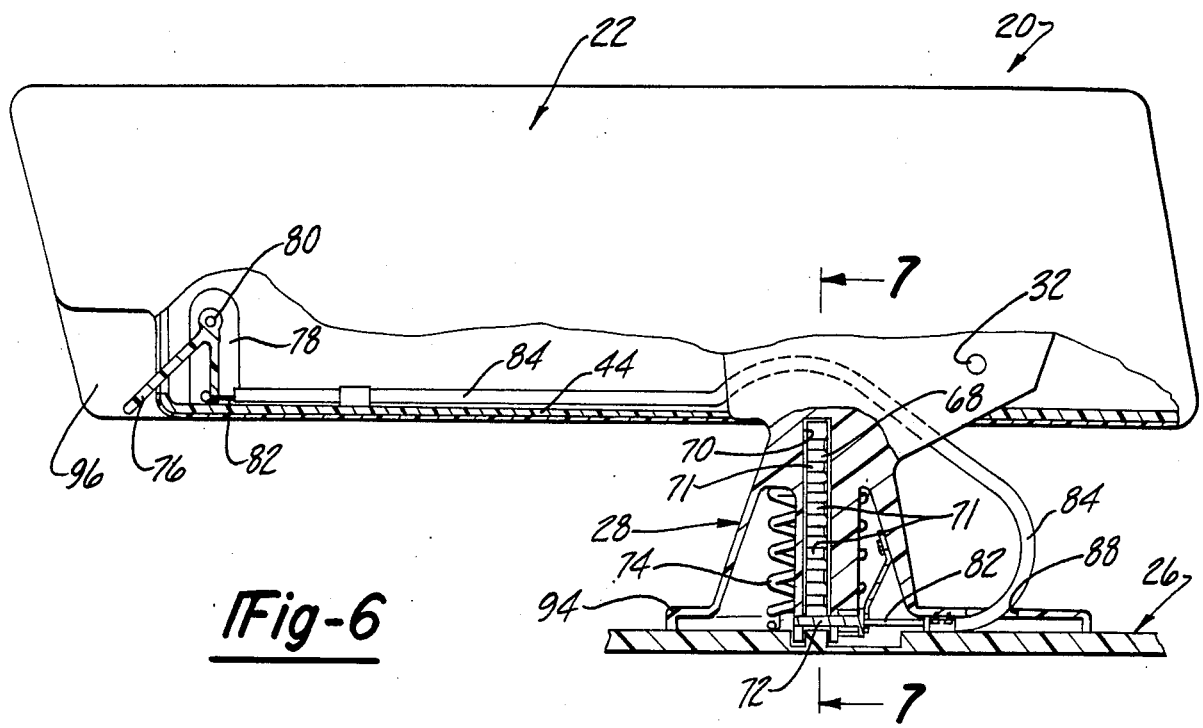
FIG. 6 is a side elevational view of the adjustable arm rest and console assembly of FIGS. 1 through 4, with some exterior portions broken away to reveal internal components of the height adjusting mechanism.
Figure 7:
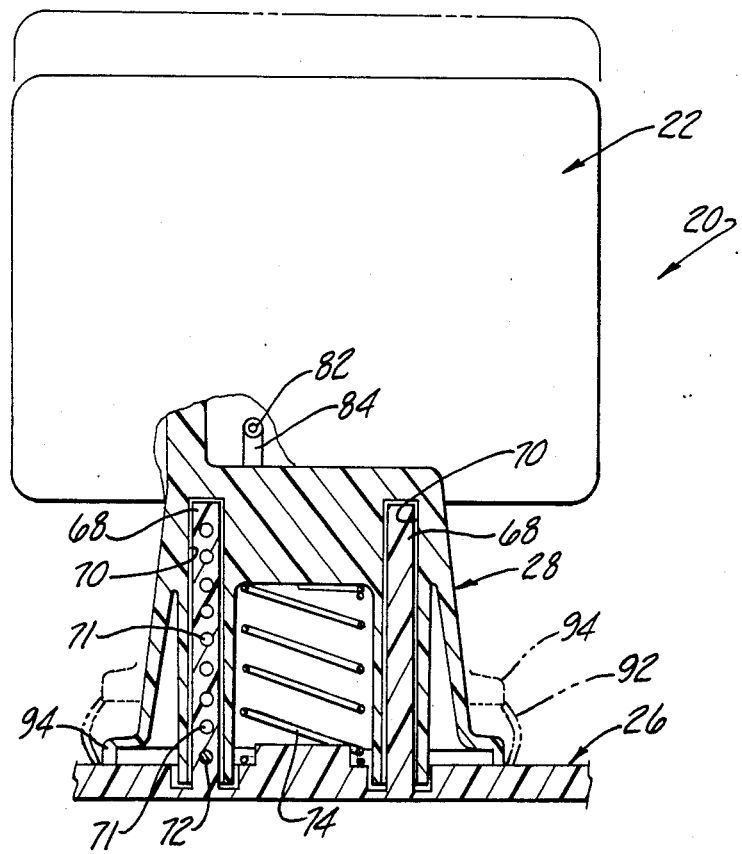
FIG. 7 is a lateral cross-sectional view taken generally along line 7—7 of FIG. 6.
Figure 8:
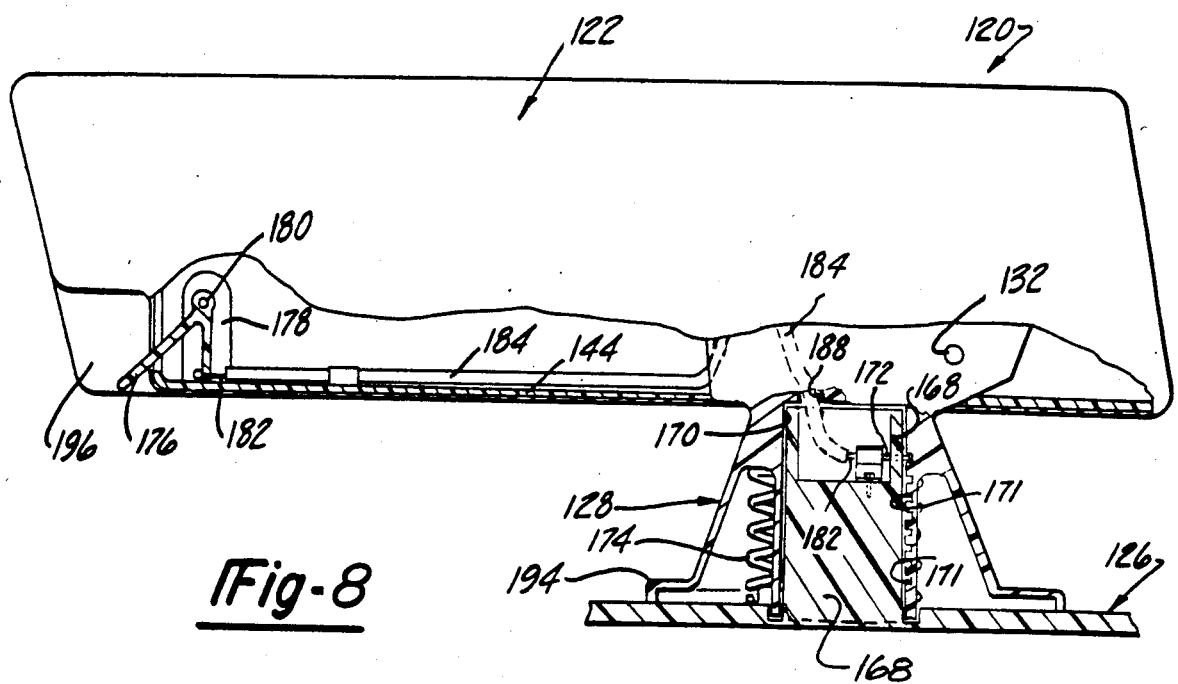
FIG. 8 is a side elevational view, similar to that of FIG. 6, but illustrating an alternate adjustable arm rest and console assembly according to the present invention.

Preferably, at least one of the column members 68 includes a plurality of openings 71 extending therethrough, either longitudinally as shown in the drawings or laterally as an alternate option. An elongated holding member 72 is interconnected with the movable support portion 28 for translational movement therewith in directions toward and away from the fixed support portion 26. The elongated holding member 72 is also interconnected with the movable support portion 28 for selected limited movement relative thereto into, or out of, any of the openings 71 in the column member 68, with each opening 71 corresponding to a preselected elevational or height position of the arm rest structure 22 and the movable support portion 28. Thus, as the arm rest structure 22 is selectively and translationally moved to a desirable or comfortable position for the user, it can be selectively held or maintained and supported in such selected adjusted position regardless of any angular attitude or pivoted position of the arm rest structure 22 relative to the support structure 24. It should be noted that although the openings 71 are shown as provided in at least one of the column members 68, which are part of the fixed support portion 26, and the elongated holding member 72 is shown as movably attached at a fixed location on the movable support portion 28, as shown in FIGS. 5 through 7, this relationship can optionally be reversed, as shown for example in FIG. 8, wherein corresponding elements are indicated by reference numerals 100 numerals higher than those of FIGS. 1 through 7. In such reversed arrangement, the openings 171 are provided in column members or other portions of the movable support structure, and the holding member 172 is attached to the fixed support portion 126 rather than the movable support portion 128.

In order to conveniently adjust the height or elevated position of the arm rest structure 22 and the movable support portion 28 relative to the fixed support portion 26, a lever member 76 is pivotally interconnected with the plate portion 44 of the arm rest structure 22 by a pivot pin 80 extending through the lever member 76 and one or more brackets 78 that are fixedly interconnected with the plate portion 44. A flexible cable 82 serves as a linkage member interconnecting the lever member 76 and the holding member 72. The flexible cable 82 is slidably movable relative to a sheath or housing 84 so that the cable and sheath assembly can be anchored to the plate portion 44 of the arm rest structure 22 and the movable support portion 28, as shown in FIG. 6, in order to transmit forces from the lever member 76 to the holding member 72 by way of the flexible cable 82. Thus, when the lever member 76 is pivoted generally forwardly and upwardly relative to the remainder of the arm rest structure 22, the flexible cable 82 transmits such pivoting force to withdraw the holding member 72 out of any of the openings 71 in the column member 68. A biasing spring 86 is preferably fixedly interconnected with the movable support portion 28 and abuttingly engages the holding member 72 in order to resiliently bias the holding member 72 toward the openings 71 in the column member 68. Thus, after the lever member 76 has been pivotally forwardly and upwardly relative to the arm rest structure 22 by the user in order to withdraw the holding member 72 from one of the openings 71, the biasing spring 86 returns the holding member 72 into another of the openings 71, and pivotally returns the lever member 76 to its original position when it is released by the user after adjusting the position of the arm rest structure 22.

In order to assist the user in translationally raising the arm rest structure 22 and the movable support portion 28 in a generally upward direction relative to the fixed support portion 26, an assist spring 74 is preferably compressed between the fixed support portion 26 and the movable support portion 28 in order to bias the arm rest structure 22 and the movable support portion 28 in a generally upward direction. Furthermore in order to cover and protect the internal components, a flexible boot 92, or other flexible member, can optionally be provided between the skirt portion 94 of the movable support portion 28 and the fixed support portion 26. Alternately, however, telescopically arranged portions of the fixed and movable support portions 26 and 28, respectively, can be provided in lieu of, or in combination with, the flexible boot 92 or other flexible member interconnecting the fixed support portion 26 and the movable support portin 28. Also, it should be noted that a recessed portion 96 is preferably provided in the arm rest structure 22 in order to house the lever member 76 such that it is protected from being inadvertently pivoted to release the holding mechanism of the height-adjusting mechanism described above.

The foregoing discussion discloses and describes exemplary embodiments of the present invention. One skilled in the art will readily recognize from such discussion that various changes, modifications and variations may be made therein without departing from the spirit and scope of the invention as defined in the following claims.

I claim:

1. An adjustable arm rest assembly comprising: a support structure including a fixed support portion; an arm rest structure pivotally interconnected with said support structure for pivotal movement relative thereto; first holding means for maintaining said arm rest structure in any of a number of preselected pivoted positions relative to said support structure; first release means for selectively releasing said first holding means in order to allow said arm rest structure to be selectively pivoted to any other of said preselected pivoted positions relative to said support structure; means for translationally moving said arm rest structure relative to said fixed support portion regardless of the pivoted position of said arm rest structure relative to said support structure; second holding means for maintaining said arm rest structure in any of a number of preselected translated positions relative to said fixed support portion; and second release means for selectively releasing said second holding means in order to allow said arm rest structure to be selectively translationally moved to any other of said preselected translated positions relative to said fixed support portion; said first holding means including ratchet means for allowing selective incremental pivotal movement of said arm rest structure in a first pivotal direction and for preventing pivotal movement of said arm rest structure in a second pivotal direction; said first release means including means for selectively disengaging said ratchet means in order to allow said arm rest structure to be pivoted in said second pivotal direction; and abutment means abuttingly engageable with said first release means for actuating said first release means when said arm rest structure is pivoted to a maximum position in said first pivotal direction in order to disengage said ratchet means when said arm rest structure is pivoted to said maximum position in said first pivotal direction.

2. An adjustable arm rest assembly according to claim 1, wherein said ratchet means comprises a rack and pawl mechanism, said rack and pawl mechanism including a rack member interconnected with one of said structures at a fixed position relative thereto, and a pawl member interconnected with the other of said structures at a fixed position relative thereto and engageable with said rack member, said rack member having a number of ratchet teeth serially arranged along a generally arcuately-extending path, said ratchet teeth being oriented to interferingly engage said pawl member in order to prevent pivotal movement of said arm rest structure in said second pivotal direction and to allow said pawl member to slidably and serially move along said arcuately-arranged ratchet teeth when said arm rest structure is pivoted in said first pivotal direction.

3. An adjustable arm rest assembly according to claim 2, further comprising resilient biasing means for resiliently biasing said pawl member toward engagement with said rack member.

4. An adjustable arm rest assembly according to claim 2, wherein said first release means includes a trip element interconnected with said pawl member for limited movement relative thereto between a first position permitting said interfering engagement between said pawl member and said rack member and a second position between said pawl member and said rack member preventing said interfering engagement therebetween, said arm rest structure being pivotally movable in said second pivotal direction when said trip element is in said second position, said trip element being abuttingly engageable with said abutment means when said arm rest structure is pivoted to said maximum position in said first pivotal direction.

5. An adjustable arm rest assembly according to claim 2, wherein said rack member is interconnected with said support structure and restrained from pivotal movement relative thereto, and said pawl member is interconnected with said arm rest structure for movement therewith.

6. An adjustable arm rest assembly according to claim 2, wherein said rack member is interconnected with said arm rest structure for movement therewith, and said pawl member is interconnected with said support structure and restrained from pivotal movement relative thereto.

7. An adjustable arm rest assembly according to claim 1, wherein said support structure includes a movable support portion translationally movable relative to said fixed support portion, said arm rest structure and said ratchet means being interconnected with said movavble support portion for translational movement therewith.

8. An adjustable arm rest assembly according to claim 7, further comprising guide means for guidingly supporting said arm rest structure for pivotal movement along an arcuate path, said supporting means including at least one arcuately-extending slot in said movable support portion and at least one pin member fixedly interconnected with said arm rest structure, said pin member being slidably received within said arcuately-extending slot.

9. An adjustable arm rest assembly comprising: a support structure including a fixed support portion; an arm rest structure pivotally interconnected with said support structure for pivotal movement relative thereto; first holding means for maintaining said arm rest structure in any of a number of preselected pivoted positions relative to said support structure; first release means for selectively releasing said first holding means in order to allow said arm rest structure to be selectively pivoted to any other of said preselected pivoted positions relative to said support structure; means for translationally moving said arm rest structure relative to said fixed support portion regardless of the pivoted position of said arm rest structure relative to said support structure; second holding means for maintaining said arm rest structure in any of a number of preselected translated positions relative to said fixed support portion; second release means for selectively releasing said second holding means in order to allow said arm rest structure to be selectively translationally moved to any other of said preselected translated positions relative to said fixed support portion; said first holding means including ratchet means for allowing selective incremental pivotal movement of said arm rest structure in a first pivotal direction and for preventing pivotal movement of said arm rest structure in a second pivotal direction; said first release means including means for selectively disengaging said ratchet means in order to allow said arm rest structure to be pivoted in said second pivotal direction; said ratchet means including a rack and pawl mechanism, said rack and pawl mechanism including a rack member interconnected with one of said structures at a fixed position relative thereto and a pawl member interconnected with the other of said structures at a fixed position relative thereto and engageable with said rack member; said rack member having a number of ratchet teeth serially arranged along a generally arcuately-extending path; said ratchet teeth being oriented to interferingly engage said pawl member in order to prevent pivotal movement of said arm rest structure in said second pivotal direction and to allow said pawl member to slidably and serially move along said arcuately-arranged ratchet teeth when said arm rest structure is pivoted in said first pivotal direction; said first release means including a trip element interconnected with said pawl member for limited movement relative thereto between a first position permitting said interfering engagement between said pawl member and said rack member and a second position between said pawl member and said rack member preventing said interfering engagement therebetween, said arm rest structure being pivotally movable in said second pivotal direction when said trip element is in said second position; and an abutment member fixed relative to said rack member at one end thereof; said trip element being abuttingly engageable with said abutment member when said arm rest structure is pivoted to a maximum position in said first pivotal direction, and said abutting engagement with said abutment member urging said trip element into said second position in order to allow said arm rest structure to be pivoted in said second pivotal direction.

10. An adjustable arm rest assembly according to claim 9, further comprising a second abutment member fixed relative to said rack member at an opposite end thereof, said trip element member being abuttingly engageable with said second abutment when said arm rest structure is pivoted to a maximum position in said second pivotal direction, said abutting engagement with said second abutment member urging said trip element into said first position in order to allow said pawl member to engage said rack member and prevent said arm rest structure from being pivoted in said second pivotal direction.

11. An adjustable arm rest assembldy comprising: a support structure having a fixed support portion and a movable support portion selectively and translationally movable in directions toward and away from said fixed support portion; an arm rest structure attached to said movable support portion for translation movement therewith; first holding means for maintaining said movable support portion and said arm rest structure in any of a number of preselected translated positions relative to said fixed support portion; first release means for selectively releasing said holding means in order to allow said movable support portion and said arm rest structure to be moved to any other of said preselected translated positions relative to said fixed support portion; means for pivotally interconnecting said arm rest structure with said movable support portion for pivotal movement relative thereto at any of said preselected translated positions relative to said fixed support portion; said arm rest assembly further including second holding means for selectiveldy maintaining said arm rest structure at any of a number of preselected pivoted positions relative to said movable support portion; second release means for selectively releasing said second holding means in order to allow said arm rest structure to be selectively pivoted to any other of said preselected pivoted positions relative to said movable support portion; and abutment means abuttingly engageable with said second release means for actuating said second release means when said arm rest structure is pivoted to a maximum position in a first pivotal direction in order to release said second holding means when said arm rest structure is pivoted to said maximum position in said first pivotal direction.

12. An adjustable arm rest assembly according to claim 11, further including resilient biasing means for resiliently biasing said movable support portion toward a direction away from said fixed support portion.

13. An adjustable arm rest assembly according to claim 11, wherein said first holding means includes a plurality of openings in one of said support portions, each of said openings corresponding to one of said preselected translated positions, an elongated holding member attached to the other of said support portions for limited movement relative thereto, said elongated holding member being selectively movable into any of said plurality of openings in order to support said movable support portion and said arm rest structure in any of said preselected translated positions relative to said fixed support and being selectively movable out of any of said plurality of openings in order to allow said movable support portion and said arm rest structure to be translationally moved relative to said fixed support portion.

14. An adjustable arm rest assembly according to claim 13, wherein said plurality of openings are in said fixed support structure, and said elongated holding member is attached to said movable support structure.

15. An adjustable arm rest assembly according to claim 13, wherein said plurality of openings are in said movable support structure, and said elongated holding member is attached to said fixed support structure.

16. An adjustable arm rest assembly according to claim 13, wherein said first release means includes a lever member attached to said arm rest structure and pivotally movable relative thereto, and linkage means interconnecting said lever member and said holding member for selectively moving said holding member into and out of any of said openings in response to selective pivotal movement of said lever member.

17. An adjustable arm rest assembly according to claim 16, wherein said linkage means comprises a flexible cable.

18. An adjustable arm rest assembly according to claim 16, further including resilient biasing means for resiliently biasing said holding member toward a direction toward said openings.

19. An adjustable arm rest assembly according to claim 18, further including resilient biasing means for resiliently biasing said movable support portion toward a direction away from said fixed support portion.

20. An adjustable arm rest assembly according to claim 19, wherein said plurality of openings are in said fixed support structure, and said elongated holding member is attached to said movable support structure.

21. An adjustable arm rest assembly according to claim 19, wherein said plurality of openings are in said movable support structure, and said elongated holding member is attached to said fixed support structure.

22. An adjustable arm rest assembly comprising: a support structure having a fixed support portion and a movable support portion selectively and translationally movable in directions toward and away from said fixed support portion; an arm rest structure pivotally interconnected with said movable support portion for pivotal movement relative thereto and for translational movement therewith in said directions toward and away from said fixed support portion; ratchet means for allowing selective incremental pivotal movement of said arm rest structure in a first pivotal direction relative to said movable support portion and for preventing pivotal movement of said arm rest structure in a second opposite pivotal direction relative to said movable support portion; first release means for selectively disengaging said ratchet means in order to allow said arm rest structure to be pivoted in said second opposite pivotal direction; holding means for selectively maintaining said movable support portion and said arm rest structure in any of a number of preselected translated positions relative to said fixed support portion regardless of the pivoted position of said arm rest structure; and second release means for selectively releasing said holding means in order to allow said translational movement of said movable support portion and said arm rest structure toward and away from said fixed support portion regardless of the pivoted position of said arm rest structure; and abutment means abuttingly engageable with said first release means for actuating said first release means when said arm rest structure is pivoted to a maximum position in said first pivotal direction in order to disengage said ratchet means when said arm rest structure is pivoted to said maximum position in said first pivotal direction.

23. An adjustable arm rest assembly according to claim 22, wherein said ratchet means comprises a rack and pawl mechanism, said rack and pawl mechanism including a rack member interconnected with said movable support portion at a fixed position relative thereto, and a pawl member interconnected with said arm rest structure at a fixed position relative thereto and engageable with said rack member, said rack member having a number of ratchet teeth serially arranged along a generally arcuately-extending path, said ratchet teeth eing oriented to interferingly engage said pawl member in order to prevent pivotal movement of said arm rest structure in said second pivotal direction and to allow said pawl member to slidably and serially move along said arcuately-arranged ratchet teeth when said arm rest structure is pivoted in said first pivotal direction.

24. An adjustable arm rest assembly according to claim 23, further comprising resilient biasing means for resiliently biasing said pawl member toward engagement with said rack member.

25. An adjustable arm rest assembly according to claim 23, wherein said first release means includes a trip element interconnected with said pawl member for limited movement relative thereto between a first position permitting said interfering engagement between said pawl member and said rack member and a second position between said pawl member and said rack member preventing said interfering engagement therebetween, said arm rest structure being pivotally movable in said second pivotal direction when said trip element is in said second position, said trip element being abuttingly engageable with said abutment means when said arm rest structure is pivoted to said maximum position in said first pivotal direction.

26. An adjustable arm rest assembly according to claim 22, wherein said ratchet means comprises a rack and pawl mechanism, said rack and pawl mechanism including a rack member interconnected with said arm rest structure at a fixed position relative thereto, and a pawl member interconnected with said movable support portion at a fixed position relative thereto and engageable with said rack member, said rack member having a number of ratchet teeth serially arranged along a generally arcuately-extending path, said ratchet teeth being oriented to interferingly engage said pawl member in order to prevent pivotal movement of said arm rest structure in said second pivotal direction and to allow said pawl member to slidably and serially move along said arcuately-arranged ratchet teeth when said arm rest structure is pivoted in said first pivotal direction.

27. An ajustable arm rest assembly according to claim 26, further comprising resilient biasing means for resiliently biasing said pawl member toward engagement with said rack member.

28. An adjustable arm rest assembly according to claim 26, wherein said first release means includes a trip element interconnected with said pawl member for limited movement relative thereto between a first position permitting said interfering engagement between said pawl member and said rack member and a second position between said pawl member and said rack member preventing said interfering engagement therebetween, said arm rest structure being pivotally movable in said second pivotal direction when said trip element is in said second position.

29. An adjustable arm rest assembly according to claim 22, further including resilient biasing means for resiliently biasing said movable support portion toward a direction away from said fixed support portion.

30. An adjustable arm rest assembly according to claim 22, wherein said holding means includes a plurality of openings in one of said support portions, each of said openings corresponding to one of said preselected translated positions, an elongated holding member attached to the other of said support portions for limited movement relative thereto, said elongated holding member being selectively movable into any of said plurality of openings in order to support said movable support portion and said arm rest structure in any of said preselected translated positions relative to said fixed support portion and being selectively movable out of any of said plurality of openings in order to allow said movable support portion and said arm rest structure to be moved relative to said fixed support portion.

31. An adjustable arm rest assembly according to claim 30, wherein said plurality of openings are in said fixed support structure, and said elongated holding member is attached to said movable support structure.

32. An adjustable arm rest assembly according to claim 30, wherein said plurality of openings are in said movable support structure, and said elongated holding member is attached to said fixed support structure.

33. An adjustable arm rest assembly according to claim 22, wherein said second release means includes a lever member attached to said arm rest structure and pivotally movable relative thereto, and linkage means interconnecting said lever member and said holding member for selectively moving said holding member into and out of any of said openings in response to selective pivotal movement of said lever member.

34. An adjustable arm rest assembly according to claim 33, wherein said linkage means comprises a flexible cable.

35. An adjustable arm rest assembly comprising: a support structure having a fixed support portion and a movable support portion selectively and translationally movable in directions toward and away from said fixed support portion; an arm rest structure pivotally interconnected with said movable support portion for pivotal movement relative thereto and for translational movement therewith in said directions toward and away from said fixed support portion; ratchet means for allowing selective incremental pivotal movement of said arm rest structure in a first pivotal direction relative to said movable support portion and for preventing pivotal movement of said arm rest structure in a second opposite pivotal direction relative to said movable support portion; first release means for selectively disengaging said ratchet means in order to allow said arm rest structure to be pivoted in said second opposite pivotal direction; holding means for selectively maintaining said movable support portion and said arm rest structure in any of a number of preselected translated positions relative to said fixed support portion regardless of the pivoted position of said arm rest structure; second release means for selectively releasing said holding means in order to allow said translational movement of said movable support portion and said arm rest structure toward and away from said fixed support portion regardless of the pivoted position of said arm rest structure; said ratchet means including a rack and pawl mechanism; said rack and pawl mechanism including a rack member interconnected with said movable support portion at a fixed position relative thereto and a pawl member interconnected with said arm rest structure at a fixed position relative thereto and engageable with said rack member; said rack member having a number of ratchet teeth serially arranged along a generally arcuately-extending path; said ratchet teeth being oriented to interferingly engage said pawl member in order to prevent pivotal movement of said arm rest structure in said second pivotal direction and to allow said pawl member to slidably and serially move along said arcuately-arranged ratchet teeth when said arm rest structure is pivoted in said first pivotal direction; said first release means including a trip element interconnected with said pawl member for limited movement relative thereto between a first position permitting said interfering engagement between said pawl member and said rack member and a second position between said pawl member and said rack member preventing said interfering engagement therebetween; said arm rest structure being pivotally movable in said second pivotal direction when said trip element is in said second position; an abutment member fixed relative to said rack member at one end thereof; said trip element being abuttingly engageable with said abutment member when said arm rest structure is pivoted to a maximum position in said first pivotal direction, said abutting engagement with said abutment member urging said trip element into said second position in order to allow said arm rest structure to be pivoted in said second pivotal direction; and a second abutment member fixed relative to said rack member at an opposite end thereof, said trip element member being abuttingly engageable with said second abutment when said arm rest structure is pivoted to a maximum position in said second pivotal direction, said abutting engagement with said second abutment member urging said trip element into said first position in order to allow said pawl member to engage said rack member and prevent said arm rest structure from being pivoted in said second pivotal direction.

36. An adjustable arm rest assembly comprising: a support structure having a fixed support portion and a movable support portion selectively and translationally movable in directions toward and away from said fixed support portion; an arm rest structure pivotally interconnected with said movable support portion for pivotal movement relative thereto and for translational movement therewith in said directions toward and away from said fixed support portion; ratchet means for allowing selective incremental pivotal movement of said arm rest structure in a first pivotal direction relative to said movable support portion and for preventing pivotal movement of said arm rest structure in a second opposite pivotal direction relative to said movable support portion; first release means for selectively disengaging said ratchet means in order to allow said arm rest structure to be pivoted in said second opposite pivotal direction; holding means for selectively maintaining said movable support portion and said arm rest structure in any of a number of preselected translated positions relative to said fixed support portion regardless of the pivoted position of said arm rest structure; second release means for selectively releasing said holding means in order to allow said translational movement of said movable support portion and said arm rest structure toward and away from said fixed support portion regardless of the pivoted position of said arm rest structure; said ratchet means including a rack and pawl mechanism; said rack and pawl mechanism including a rack member interconnected with said arm rest structure at a fixed position relative thereto and a pawl member interconnected with said movable support portion at a fixed position relative thereto and engageable with said rack member; said rack member having a number of ratchet teeth serially arranged along a generally arcuately-extending path; said ratchet teeth being oriented to interferingly engage said pawl member in order to prevent pivotal movement of said arm rest structure in said second pivotal direction and to allow said pawl member to slidably and serially move along said arcuately-arranged ratchet teeth when said arm rest structure is pivoted in said first pivotal direction; said first release means including a trip element interconnected with said pawl member for limited movement relative thereto between a first position permitting said interfering engagement between said pawl member and said rack member and a second position between said pawl member and said rack member preventing said interfering engagement therebetween; said arm rest structure being pivotally movable in said second pivotal direction when said trip element is in said second position; an abutment member fixed relative to said rack member at one end thereof; said trip element being abuttingly engageable with said abutment member when said arm rest structure is pivoted to a maximum position in said first pivotal direction, said abutting engagement with said abutment member urging said trip element into said second position in order to allow said arm rest structure to be pivoted in said second pivotal direction; and a second abutment member fixed relative to said rack member at an opposite end thereof, said trip element member being abuttingly engageable with said second abutment when said arm rest structure is pivoted to a maximum position in said second pivotal direction, said abutting engagement with said second abutment member urging said trip element into said first position in order to allow said pawl member to engage said rack member and prevent said arm rest structure from being pivoted in said second pivotal direction.

37. An adjustable arm rest assembly comprising a support structure having a fixed support portion and a movable support portion selectively and translationally movable in generally vertical directions toward and away from said fixed support portion, an arm rest structure pivotally interconnected with said movable support portion for generally vertical pivotal movement relative to a generally horizontal pivot axis carried by said movable support portion and for translational movement with said movable support portion in said generally vertical directions toward and away from said fixed support portion regardless of the pivotal movement of said arm rest structure relative to said movable support portion, ratchet means for allowing selective incremental pivotal movement of said arm rest structure in a generally upward pivotal direction and for preventing said pivotal movement of said arm rest structure in a generally downward pivotal direction relative to said movable support portion, first release means for selectively disengaging said ratchet means in order to allow said arm rest structure to be pivoted in said generally downward pivotal direction, said ratchet means including a rack member interconnected with one of said arm rest structure and movable support portion at a fixed position relative thereto, and a pawl member interconnected with the other of said arm rest structure and movable support portion, said pawl member being engageable with said rack member, said rack member having a number of ratchet teeth serially arranged along a generally arcuately-extending path, said ratchet teeth being oriented to interferingly engage said pawl member in order to prevent pivotal movement of said arm rest structure in said generally downward pivotal direction and to allow said pawl member to slidably and serially move along said arcuately-arranged ratchet teeth when said arm rest structure is pivoted in said generally upward pivotal direction, a trip element interconnected with said pawl member for limited movement relative thereto between a first position permitting said interfering engagement between said pawl member and said rack member and a second position between said pawl member and said rack member holding said pawl member out of said interfering engagement with said rack member, said arm rest structure being pivotally movable in said generally downward pivotal direction when said trip element is in said second position, said assembly further including holding means for selectively maintaining said movable support portion and said arm rest structure in any of a number of translated positions relative to said fixed support portion regardless of the pivoted position of said arm rest structure relative to said movable support portion, said holding means including a plurality of openings in one of said support portions, each of said openings corresponding to one of said preselected translated positions, an elongated holding member attached to the other of said support portions for limited movement relative thereto, said elongated holding member being selectively movable into any of said plurality of openings in order to support said movable support portion and said arm rest structure in any of said preselected translated positions relative to said fixed support portion, said elongated holding member also being selectively movable out of any of said plurality of openings in order to allow said movable support portion and said arm rest structure to be translationally moved generally vertically relative to said fixed support portion.

38. An adjustable arm rest assembly according to claim 37, wherein said rack member is interconnected with said movable support portion, and said pawl member is interconnected with said arm rest structure.

39. An adjustable arm rest assembly according to claim 37, wherein said rack member is interconnected with said arm rest structure, and said pawl member is interconnected with said movable support structure.

40. An adjustable arm rest assembly according to claim 37, wherein said plurality of openings are in said fixed support structure, and said elongated holding member is attached to said movable support structure.

41. An adjustable arm rest assembly according to claim 37, wherein said plurality of openings are in said movable support structure, and said elongated holding member is attached to said fixed support structure.

42. An adjustable arm rest assembly according to claim 37, further comprising resilient biasing means for resiliently biasing said pawl member toward engagement with said rack member.

43. An adjustable arm rest assembly according to claim 37, further comprising resilient biasing means for resiliently biasing said movable support portion in a direction away from said fixed support portion.

44. An adjustable arm rest assembly according to claim 37, further comprising a lever member attached to said arm rest structure and pivotally movable relative thereto, and linkage means interconnecting said lever member and said holding member for selectively moving said holding member into and out of any of said openingsin response to selective pivotal movement of said lever member.

45. An adjustable arm rest assembly according to claim 37, further comprising an abutment member fixed relative to said rack member at one end thereof, said trip element being abuttingly engageable with said abutment member when said arm rest structure is pivoted to a maximum upward position, said abutting engagement with said abutment member urging said trip element into said second position in order to allow said arm rest structure to be pivoted in said generally downward pivotal direction.

46. An adjustable arm rest assembly according to claim 45, further comprising a second abutment member fixed relative to rack member at an opposite end thereof, said trip element member being abuttingly engageable with said second abutment when said arm rest structure is pivoted to a maximum downward position, said abutting engagement with said second abutment member urging said trip element into said first position in order to allow said pawl member to engage said rack member and prevent said arm rest structure from being pivoted in said second direction.

47. An adjustable arm rest assembly according to claim 37, wherein said arm rest assembly comprises a console assembly for a vehicle having an interior floor and at least a pair of seats spaced laterally apart from one another thereon, said fixed support structure being adapted to be fixedly attached to said floor between said spaced-apart seats.

48. An adjustable arm rest assembly according to claim 37, wherein said trip element includes a generally plate-shaped portion with an opening extending therethrough, said pawl member extending through said opening in said plate-shaped portion of said trip element to engage said rack member when said trip element is in said first position, said plate-shapd portion being interposed between said pawl member and said rack member when said trip element is in said second position.

49. An adjustable arm rest assembly according to claim 48, further comprising resilient biasing means for resiliently biasing said pawl member toward said rack member.

50. An adjustable arm rest assembly according to claim 37, further comprising guide means for guidingly supporting said arm rest structure for said pivotal movement along an arcuate path, said supporting means including at least one arcuately-extending slot in said movable support portion and at least one pin member fixedly interconnected with said arm rest structure, said pin member being slidably received within said arcuately-extending slot.

51. An adjustable arm rest assembly comprising a support structure, an arm rest structure pivotally interconnected with said support structure for generally vertical pivotal movement relative to said support structure, ratchet means for allowing selective incremental pivotal movement of said arm rest structure in a generally upward pivotal direction and for preventing said pivotal movement of said arm rest structure in a generally downward pivotal direction relative to said support structure, release means for selectively disengaging said ratchet means in order to allow said arm rest structure to be pivoted in said generally downward pivotal direction, said ratchet means including a rack member interconnected with one of said arm rest structure and support structure at a fixed position relative thereto, and a pawl member interconnected with the other of said arm rest structure and support structure, said pawl member being engageable with said rack member, said rack member having a number of ratchet teeth serially arranged along a generally arcuately-extending path, said ratchet teeth being oriented to interferingly engage said pawl member in order to prevent pivotal movement of said arm rest structure in said generally downward pivotal direction and to allow said pawl member to slidably and serially move along said arcuately-arranged ratchet teeth when said arm rest structure is pivoted in said generally upward pivotal direction, a trip element interconnected with said pawl member for limited movement relative thereto between a first position permitting said interfering engagement between said pawl member and said rack member and a second position between said pawl member and said rack member holding said pawl member out of said interfering engagement with said rack member, said arm rest stucture being pivotally movable in said generally downward pivotal direction when said trip element is in said second position.

52. An adjustable arm rest assembly according to claim 51, wherein said rack member is interconnected with said movable support portion, and said pawl member is interconnected with said arm rest structure.

53. An adjustable arm rest assembly according to claim 51, wherein said rack member is interconnected with said arm rest structure, and said pawl member is interconnected with said movable support structure.

54. An adjustable arm rest assembly according to claim 51, further comprising resilient biasing means for resiliently biasing said pawl member toward engagement with said rack member.

55. An adjustable arm rest assembly according to claim 51, further comprising an abutment member fixed relative to said rack member at one end thereof, said trip element being abuttingly engageable with said abutment member when said arm rest structure is pivoted to a maximum upward position, said abutting engagement with said abutment member urging said trip element into said second position in order to allow said arm rest structure to be pivoted in said generally downward pivotal direction.

56. An adjustable arm rest assembly according to claim 51, further comprising a second abutment member fixed relative to rack member at an opposite end thereof, said trip element member being abuttingly engageable with said second abutment when said arm rest structure is pivoted to a maximum downward position, said abutting engagement with said second abutment member urging said trip element into said first position in order to allow said pawl member to engage said rack member and prevent said arm rest structure from being pivoted in said second direction.

57. An adjustable arm rest assembly according to claim 51, wherein said trip element includes a generally plate-shaped portion with an opening extending therethrough, said pawl member extending through said opening in said plate-shaped portion of said trip element to engage said rack member when said trip element is in said first position, said plate-shaped portion being interposed between said pawl member and said rack member when said trip element is in said second position.

58. An adjustable arm rest assembly according to claim 51, further comprising guide means for guidingly supporting said arm rest structure for said pivotal movement along an arcuate path, said supporting means including at least one arcuately-extending slot in said movable support portion and at least one pin member fixedly interconnected with said arm rest structure, said pin member being slidably received within said arcuately-extending slot.

* * * * *

UNITED STATES PATENT AND TRADEMARK OFFICE
CERTIFICATE OF CORRECTION

PATENT NO. : 4,674,790
DATED : June 23, 1987
INVENTOR(S) : LeRoy B. Johnson

It is certified that error appears in the above—identified patent and that said Letters Patent is hereby corrected as shown below:

Column 1, line 35, "art" should be --arm--

Column 9, line 9, Claim 7, "movavble" should be --movable--

Column 10, line 25, Claim 11, "assembldy" should be --assembly--

Column 10, line 30, Claim 11, "translation" should be --translational--

Column 10, line 44, Claim 11, "selectiveldy" should be --selectively--

Column 11, line 5, Claim 13, after "support" insert --portion--

Column 12, line 20, Claim 23, "eing" should be --being--

Column 12, line 62, Claim 27, "ajustable" should be --adjustable--

Column 17, line 11, Claim 44, "openingsin" should be --openings in--

Column 17, line 47, Claim 48, "plate-shapd" should be --plate-shaped--

Signed and Sealed this

Twelfth Day of January, 1988

*Attest:*

DONALD J. QUIGG

*Attesting Officer*     *Commissioner of Patents and Trademarks*